(12) United States Patent
Theel et al.

(10) Patent No.: US 10,486,663 B2
(45) Date of Patent: Nov. 26, 2019

(54) METHOD AND APPARATUS FOR STABILIZING THE RUNNING OF A WOBBLING TRAILER

(75) Inventors: Thomas Theel, Oberhausen (DE); Matthias Muntu, Hofheim am Taunus (DE); Volker Bremeier, Münster (DE)

(73) Assignees: AUDI AG, Ingolstadt (DE); CONTINENTAL TEVES AG & CO. OHG, Frankfurt am Main (DE)

( * ) Notice: Subject to any disclaimer, the term of this patent is extended or adjusted under 35 U.S.C. 154(b) by 1219 days.

(21) Appl. No.: 13/984,489

(22) PCT Filed: Feb. 2, 2012

(86) PCT No.: PCT/EP2012/000465
§ 371 (c)(1),
(2), (4) Date: Oct. 3, 2013

(87) PCT Pub. No.: WO2012/107184
PCT Pub. Date: Aug. 16, 2012

(65) Prior Publication Data
US 2014/0025273 A1    Jan. 23, 2014

(30) Foreign Application Priority Data
Feb. 11, 2011  (DE) .......................... 10 2011 010 994

(51) Int. Cl.
*B60T 8/17*    (2006.01)
(52) U.S. Cl.
CPC .................................. *B60T 8/1708* (2013.01)
(58) Field of Classification Search
None
See application file for complete search history.

(56) References Cited

U.S. PATENT DOCUMENTS 7,338,335 B1 * 3/2008 Messano ..................... 180/65.22
2006/0204347 A1 * 9/2006 Waldbauer et al. .......... 410/156
(Continued)

FOREIGN PATENT DOCUMENTS

CN    1441735    9/2003
CN    101479138    7/2009
(Continued)

OTHER PUBLICATIONS

International Search Report issued by the European Patent Office in International Application PCT/EP2012/00465 dated Apr. 24, 2012.
(Continued)

*Primary Examiner* — Todd M Melton
*Assistant Examiner* — Jason R Roberson
(74) *Attorney, Agent, or Firm* — Henry M. Feiereisen LLC

(57) ABSTRACT

In a method and apparatus for stabilizing running of a wobbling trailer towed by a vehicle, a tandem of trailer and vehicle is braked by a brake device activated by a control device. The braking process is triggered, when an amplitude of the oscillation of the trailer exceeds a predetermined value. As a result, the tandem is decelerated to a speed at which the amplitude of the oscillation of the trailer falls below a predetermined value. The tandem is decelerated more intensely in the case of a wobbling trailer and when travelling at a first travelling speed than in the case of a wobbling trailer and when travelling at a second travelling speed which is lower than the first travelling speed, and the tandem is braked in presence of the first driving speed during exceeding a lower value of the amplitude than in the presence of the second driving speed.

5 Claims, 1 Drawing Sheet

(56) References Cited

U.S. PATENT DOCUMENTS

2008/0255741 A1\* 10/2008 Traechtler .................. 701/70
2009/0125182 A1    5/2009 Hoetzer et al.
2010/0305794 A1   12/2010 Foster

FOREIGN PATENT DOCUMENTS

| DE | 102 25 120     | 11/2003 |
| DE | 102004005074   | 4/2005  |
| DE | 102009011907   | 9/2010  |
| EP | 2 008 892      | 12/2008 |
| EP | 2 058 190      | 5/2009  |
| EP | 1 784 326      | 9/2010  |
| KR | 10-2009-0092837| 9/2009  |
| WO | WO 2004/041612 | 5/2004  |

OTHER PUBLICATIONS

Chinese Search Report issued in counterpart Chinese Patent Application No. 201280083164 dated Feb. 2, 2015.
English translation of Chinese Search Report issued in counterpart Chinese Patent Application No. 201280083164 dated Feb. 2, 2015.

\* cited by examiner

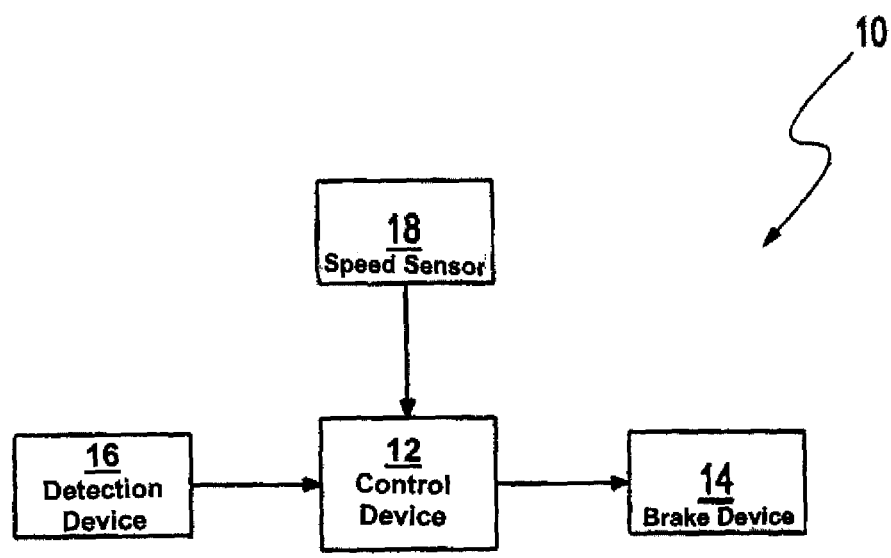

METHOD AND APPARATUS FOR STABILIZING THE RUNNING OF A WOBBLING TRAILER

CROSS-REFERENCES TO RELATED APPLICATIONS

This application is the U.S. National Stage of International Application No. PCT/EP2012/000465, filed Feb. 2, 2012, which designated the United States and has been published as International Publication No. WO 2012/107184 and which claims the priority of German Patent Application, Serial No. 10 2011 010 994.3, filed Feb. 11, 2011, pursuant to 35 U.S.C. 119(a)-(d).

BACKGROUND OF THE INVENTION

The invention relates to a method of stabilizing the running of a wobbling trailer towed by a vehicle. In this case a tandem comprising the trailer and the vehicle is braked automatically when an amplitude of oscillation of the trailer exceeds a predetermined value. Thereby the tandem is decelerated to a speed at which the amplitude of oscillation of the trailer falls below a predetermined value. Furthermore, the invention relates to an apparatus for stabilizing the running of a wobbling trailer.

The EP 1 784 326 B1 describes a process for assisting the driver of a motor vehicle with a wobbling trailer. For detecting a pendulum motion of the trailer the yaw rate, lateral acceleration and the steering angle of the vehicle are evaluated. A warning note is sent to the driver when there is a strong oscillation of the trailer, to cause him to brake. The brake action applied by the driver is monitored and supported by automatic action of the vehicle brakes, and a brake pressure is applied, with which a vehicle deceleration for the purpose of stabilizing the trailer is achieved. In this case the brake pressure adjusted automatically for assisting the driver is adjusted in dependence on the pressure, which the driver applies on the brake pedal. In case of heavy oscillations of the trailer, the vehicle is stabilized directly, independently of any help of the driver by an automatic brake engagement. The automatic brake engagement is dependent on the vehicle speed and the magnitude of the oscillation.

Furthermore, it is known from the prior art to make the type of the braking engagement during the automatic braking dependent on the amplitude of the oscillation. In the case of strong oscillations of the trailer preferably all brakeable wheels of the vehicle—possible also mutually—are braked. At moderate oscillations which have a potential to transition to a building up oscillation, however often alternating braking engagements are performed to avoid that the amplitudes of the oscillation increase.

SUMMARY OF THE INVENTION

Object of the present invention is to improve a method of the aforementioned type and a corresponding apparatus, so that the running of the trailer is particularly reliably stabilized.

According to one aspect of the invention, the object is achieved by a method of stabilizing the running of a wobbling trailer which is towed by a vehicle, in which a tandem comprised of the trailer and the vehicle is braked automatically when an amplitude of the oscillation of the trailer is above a predetermined value, wherein the tandem is decelerated to a speed at which the amplitude of the oscillation of the trailer is below a predetermined value, wherein with wobbling trailer and in the presence of a first driving speed of the tandem, the tandem is decelerated more that with wobbling trailer and in the presence of a second driving speed of the tandem, which is lower than the first driving speed, wherein the tandem is braked in the presence of the first driving speed at exceeding a lower value of the amplitude is braked than at presence of the second driving speed.

According to another aspect of the invention, the object is achieved by an apparatus for stabilizing the drive of a wobbling trailer towed by a vehicle, with a detection device for detecting an amplitude of the oscillation of the trailer and with a brake device for braking a tandem comprising the trailer and the vehicle depending on a value of the amplitude, wherein the brake device is constructed so that, the tandem is decelerated to a speed, at which the amplitude of the trailer is below a predetermined value, wherein a control unit is provided for controlling the brake device depending on the driving speed of the tandem so that with wobbling trailer and in the presence of a first driving speed, the tandem is decelerated more than with wobbling trailer and in the presence of a second driving speed of the tandem, which is smaller than the first driving speed, and so that the tandem in the presence of the first driving speed is braked when exceeding a lower value of the amplitude than in the presence of the second driving speed.

Advantageous embodiments with useful developments of the invention are disclosed in the dependent claims.

In the method according to the invention with a wobbling trailer and in the presence of a first driving speed of the tandem, the tandem is decelerated more than when the trailer wobbles and in the presence of a second driving speed of the tandem, which is less than the first driving speed. In this case the tandem in the presence of the first driving speed is braked at exceeding a lower value of an amplitude than in the presence of the second driving speed.

This is based on the recognition that a wobbling of the trailer, which is triggered for example by driving over a bump, at a lower driving speed is less critical than a oscillation with the same amplitude at a higher driving speed. Accordingly, in the presence of a higher driving speed the braking process is already triggered when an amplitude of the oscillation of the trailer is present, which at lower driving speed is considered safe. In addition at higher driving speed and at the same time critically wobbling trailer the tandem is particularly strongly decelerated. Therefore in case of exceeding of the speed dependent value of the amplitude the oscillation of the tandem is braked not with a constant preset deceleration, but the deceleration is also speed dependent.

By the speed-dependent different magnitude of decelerations of the tandem, it can be ensured that a renewed wobbling of the trailer is not encountered immediately after an apparent stabilization of the running of the trailer. Such a renewed wobbling of the trailer could be experienced, for example, when a given load condition of the trailer is present, such as an unfavorable weight distribution to front and rear portions of the trailer. Also the supporting load acting on a trailer hitch, the power and the weight of the towing vehicle, the geometric layout of the trailer and the condition of the tires of the vehicle and trailer can have an influence on whether it immediately after apparent stabilization will come up to a renewed swinging.

Because in this case with the high driving speed and wobbling trailer the tandem is very much decelerated, the oscillations are very fast and very strongly damped. The attenuation constant which describes the decay of the oscillation is namely dependent on the driving speed and also on the load, and at particularly high driving speed there is a relatively small attenuation constant. The stronger damping, which is present at lower driving speed of the tandem, is reached by the strong, if necessary also reciprocal, deceleration particularly quickly, so that a repeated swinging of the trailer is safely prevented.

Traffic existing backwards and sideways of the tandem is not endangered by the trailer which swings again. Also the stabilizing automatic braking process does not need to be done again within a short time interval, so that the driver of the tandem is not confused by a new unexpected automatically triggered braking engagement and does not feel braked.

The particularly secure stabilization of the trailer is especially beneficial when the tandem before the braking has a particularly high driving speed, and/or when a relatively slippery road, especially wet road, exists.

In an advantageous embodiment of the invention the braking process initiated in the presence of the first driving speed is terminated only at falling below a lower value of the amplitude than the braking process initiated in the presence of the second driving speed. It is not only the beginning of the automatically carried out braking process is made dependent on the amplitude of the oscillation, which is present at a particular driving speed, but also the end of the braking process. Thereby it is particularly reliably ensured that at high driving speed the tandem is not only decelerated up to apparent stabilization, but that the amplitude of the oscillation is reduced to the extent that a new critical state of the tandem is no longer to be expected.

For braking of the tandem, the power output of a drive motor can be reduced. Preferably however at least one service brake is also activated. When the vehicle has at least one electric drive motor designed for driving a wheel, this can be used also to deceleration the tandem. Thereby a particularly strong deceleration can be guaranteed, that also leads at high driving speed to a rapid stabilization of the running of the trailer.

As a further advantage it has been found when the tandem is also then braked, when a driver of the vehicle requests a higher power output of a drive motor or when the driver leaves a brake device of the vehicle not activated. A wrong action of the driver in view of the critical situation of the tandem, namely either remain passive or accelerate compensated.

Finally it has been shown to be advantageous when the tandem is stronger automatically braked if a driver of the vehicle does not sufficiently hard press a brake device of the vehicle, to decelerate the tandem to the speed, at which the amplitude of the oscillation of the trailer is below a predetermined value. It is thereby ensured that the stable tandem state, namely falling below the predetermined value of the amplitude of the oscillation of the trailer, is achieved regardless of any driver's braking operation reliably and fast.

The apparatus according to the invention for stabilization of the running of a wobbling trailer towed by a vehicle comprises a detection device by means of which an amplitude of oscillation of the trailer is detected. A brake device brakes a tandem comprising the trailer and the vehicle in dependence on a value of an amplitude. In this case the brake device is constructed to decelerate the tandem to a speed, at which the amplitude of the oscillation of the trailer is below a predetermined value. A control device is constructed for controlling the brake device in dependence on the driving speed of the tandem so that with the wobbling trailer and in the presence of a first driving speed of the tandem the tandem is decelerated more than with the wobbling trailer and in the presence of a second driving speed of the tandem, which is smaller than the first driving speed. In addition, the control device controls the brake device so that the tandem in the presence of the first driving speed is braked at exceeding of a lower value of the amplitude than in the presence of the second driving speed.

As a brake device, the service brake of the vehicle acting on the wheels and/or the brakes acting on the wheels of the trailer can be used. Also an electric drive motor designed for driving wheels of the vehicle, such as a wheel hub motor, can be used to decelerate the tandem.

The described advantages of the method according to the invention and preferred embodiments also apply to the apparatus according to the invention.

The features referred to above in the description and combinations of the features as well as the features mentioned below in the description of the FIGURE and/or features shown in the FIGURE alone and feature combinations can be used not only in the specified combination, but also in other combinations or individually without departing from the scope of the invention.

BRIEF DESCRIPTION OF THE DRAWING

Other advantages, features and details of the invention will be apparent from the claims, the following description of preferred embodiments and with reference to the drawing in which the sole FIGURE schematically shows an apparatus for stabilizing the running of a wobbling trailer, with which a method for stabilizing the running of the wobbling trailer is implemented.

Turning mow to the sole FIGURE, there is shown schematically an apparatus for stabilizing the running of the tandem which includes a trailer and a tow vehicle.

The apparatus 10 shown in the FIGURE includes a control device 12, which is designed to control a brake device 14. When the brake device 14 is controlled, it provides a deceleration of the tandem, regardless of whether or not the driver of the tow vehicle operated a brake or not. The brake device 14 acts on all brakeable wheels of the vehicle, which pulls the trailer.

To determine whether such automatically performed brake engagement is necessary, the control device 12 evaluates signals of a detection device 16 which detects an amplitude of the oscillation of the trailer. For this purpose the lateral acceleration, yaw rate and steering angle of the vehicle can be evaluated, which are already used in the vehicle within the framework of the electronic stability control (ESP) of the control device 12.

In the present case entry thresholds are stored in the control device 12, above which the control device 12 causes the brake by means of the brake device 14. These entry thresholds are limiting values for the amplitude of oscillation of the trailer, and the limiting values are dependent on the speed. Accordingly, the control device 12 supplies also a data value representing the driving speed of the tandem from a speed sensor 18.

At a high driving speed, the braking process is triggered automatically even if a relatively small amplitude of the oscillation of the trailer is present. At a low driving speed, it can be provided, however, that even a higher amplitude of the oscillation still does not lead the automatically operated brake engagement triggered by the control device 12.

The data value supplied by the speed sensor 18 is in present case also used to determine the magnitude of the deceleration with which the brake device 14 slows down the tandem. Accordingly, with a high driving speed and wobbling trailer the tandem is decelerated more than at a lower driving speed and possibly stronger wobbling trailer.

The especially strong deceleration of the tandem which activates the brake device 14, leads to the fact that the tandem reaches faster an area of the driving speed, at which the attenuation constant associated with the tandem is greater than at a high driving speed. An especially low attenuation constant is present at a high driving speed so that the oscillation of the trailer subsides relatively slow.

DETAILED DESCRIPTION OF PREFERRED EMBODIMENTS

If, however, the tandem is heavily decelerated, then the speeds attenuation constant that is larger at lower driving speed ensures that the oscillation of the trailer especially rapidly subsides. Therefore it is reliably avoided that immediately after the braking process triggered by the control device 12 by controlling the brake device 14, renewed, unwanted oscillation of the trailer occurs.

The driver feels so not slowed down and is not confused, that after an immediate first automatic braking process following new swinging (seemingly stabilized) of the trailer, the speed of the tandem is automatically decelerated. Also, traffic participants located behind or beside the tandem in a critical driving situation are not endangered by the renewed oscillation on the trailer.

The strong deceleration in particular at high driving speed acts positively on the stabilization of the running of the trailer, and in particular if there is a relatively slippery roadway.

In this case, the exit thresholds of the tandem stabilization dependent on the driving speed are preferred. Accordingly the braking process triggered during strong deceleration of the tandem by the control device 12 first ends when the oscillation of the trailer has reached a relatively low value. When however with wobbling trailer a relatively low speed is present, a less powerful automatic braking engagement is performed, and the braking process is terminated, even if the oscillation of the trailer still has comparatively large amplitude. At low driving speed of the tandem, the then quite large attenuation constant namely ensures a rapid decay of this oscillation having a relatively large amplitude.

The control device 12 can involve in particular an ESP control unit, in which a characteristic is stored for providing the speed dependent target deceleration of the tandem with the wobbling trailer.

The invention claimed is:
1. A method of stabilizing a running of a wobbling trailer which is towed by a vehicle, comprising:
 determining an amplitude of an oscillation of the wobbling trailer;
 initiating automatic braking of the vehicle based on the amplitude of the oscillation;
 stabilizing the wobbling trailer by the automatic braking of the vehicle at a first speed-dependent attenuation coefficient, when the vehicle travels at a first driving speed; and
 increasing the first attenuation coefficient during braking to a second attenuation coefficient at a second driving speed which is lower than the first driving speed.
2. The method of claim 1, further comprising terminating the automatic braking initiated when the vehicle with the wobbling trailer travel with the first driving speed only when the amplitude of the oscillation of the wobbling trailer falls below the amplitude of the oscillation of the wobbling trailer when the vehicle with the wobbling trailer travel with the second driving speed.
3. The method of claim 1, further comprising performing the automatic braking by an action selected from the group consisting of reducing a power output of a drive motor of the vehicle, actuating at least one action brake of the vehicle, using at least one electric motor constructed for driving a wheel of the vehicle, and combinations thereof.
4. The method of claim 3, further comprising braking the vehicle with the wobbling trailer also when a driver of the vehicle requests a higher power output of the drive motor of the vehicle or leaves a brake device not operated.
5. Apparatus for stabilizing a running of a wobbling trailer towed by a vehicle, comprising:
 a detecting device for detecting an amplitude of an oscillation of the wobbling trailer;
 a brake device for braking the vehicle; and
 a control unit for controlling the brake device, said control unit being configured to initiate automatic braking of the vehicle based on the amplitude of the oscillating to thereby stabilize the wobbling trailer through the automatic braking of the vehicle at a first speed-dependent attenuation coefficient, when the vehicle travels at a first driving speed, and through increase of the first attenuation coefficient during braking to a second attenuation coefficient at a second driving speed which is lower than the first driving speed.

\* \* \* \* \*